United States Patent [19]

Black, Jr. et al.

[11] 4,444,398
[45] Apr. 24, 1984

[54] SELF-ACTIVATING FERROFLUID SEAL APPARATUS AND METHOD

[75] Inventors: Thomas J. Black, Jr., Lowell; Philip Stahl, Holliston, both of Mass.

[73] Assignee: Ferrofluidics Corporation, Nashua, N.H.

[21] Appl. No.: 468,333

[22] Filed: Feb. 22, 1983

[51] Int. Cl.³ .............................................. F16J 15/40
[52] U.S. Cl. ........................................ 277/1; 277/80; 277/135
[58] Field of Search ............... 277/1, 80, 135, DIG. 7; 308/10, 36.1, 187.1, 187.2

[56] References Cited

U.S. PATENT DOCUMENTS

| | | | |
|---|---|---|---|
| 4,171,818 | 10/1979 | Moskowitz et al. | 277/80 |
| 4,252,328 | 2/1981 | Raj et al. | 277/80 X |
| 4,252,353 | 2/1981 | Raj et al. | 277/80 |

FOREIGN PATENT DOCUMENTS

| | | | |
|---|---|---|---|
| 773348 | 10/1980 | U.S.S.R. | 277/80 |
| 892075 | 12/1981 | U.S.S.R. | 277/80 |

Primary Examiner—Robert S. Ward
Attorney, Agent, or Firm—Richard P. Crowley

[57] ABSTRACT

A self-activating ferrofluid seal apparatus and method, which seal apparatus comprises a permanent-magnet ring and a pair of pole pieces which form a cavity therebetween, and which seal apparatus includes magnetically permeable, extending elements in the cavity to form a ferrofluid-retaining gap therebetween, the pole pieces forming a radial gap with the surface of the shaft to be sealed, the ferrofluid-retaining gap having a magnetic-field intensity sufficient to retain the ferrofluid therebetween and sufficiently larger in gap width than the radial gap, whereby, on insertion of the shaft element, the ferrofluid, based on the change in magnetic flux path, will move from the retaining gap to the radial gap to form a ferrofluid seal about the shaft element.

22 Claims, 7 Drawing Figures

SELF-ACTIVATING FERROFLUID SEAL APPARATUS AND METHOD

BACKGROUND OF THE INVENTION

Magnetic fluid or ferrofluid magnetic seals have been used as exclusion seals or as multiple-stage seal apparatuses, where a difference in pressure environments is involved. Ferrofluid exclusion seal apparatuses are particularly useful in providing effective seals in computer-disc-drive systems and in other high-performance precision spindle applications. The difficulties associated with the application of the particular ferrofluid or magnetic fluid into the seal by the user, either exclusion seals or multiple-stage seals, have led to the development of self-activating fluid seal apparatuses, such as described in U.S. Pat. Nos. 4,252,328 and 4,252,353, both issued Feb. 24, 1981 (both hereby incorporated by reference).

In U.S. Pat. No. 4,252,328, a self-activating ferrofluid seal apparatus is described which is particularly useful with a memory disc-drive shaft, wherein the seal apparatus contains a cavity between the pole pieces, and a closed loop of a tubular container with a sealing amount of ferrofluid is positioned within the cavity. Just prior to insertion of the magnetically permeable shaft element to be sealed, a penetration clamp is employed to penetrate the plastic tubular container, to permit the ferrofluid in the container to move from the container into a sealing relationship in the radial gap about the ends of the pole pieces.

In U.S. Pat. No. 4,252,353, a self-activating seal apparatus is disclosed, wherein the pole pieces form a cavity for storing a sealing amount of a ferrofluid, until the magnetically permeable shaft is inserted within the seal apparatus. The ferrofluid is retained within the cavity generally adjacent the intersection of the magnetic ring element and the first and second pole pieces, while a nonmagnetic sealing ring is also employed to retain the sealing volume of ferrofluid within the cavity in the stored position. On removal of the nonmagnetic ring element and the insertion of the magnetically permeable shaft, the magnetic field is so altered and the flux path diverted from the intersection of the permanent-magnet ring element and the pole pieces to the radial gap separating the ends of the pole pieces and the surface of the shaft element, so that the ferrofluid then forms a self-activating, ferrofluid, O-ring seal with the surface of the shaft element. While such self-activating ferrofluid seal apparatuses are effective, it is desirable to provide for a self-activating seal apparatus and method of improved design, cost and simplicity.

SUMMARY OF THE INVENTION

The invention relates to an improved, self-activating, ferrofluid seal apparatus and to a method of self-activating sealing employing such seal apparatus. In particular, the invention concerns a self-activating, ferrofluid exclusion seal apparatus and its use particularly in providing an effective exclusion seal for a computer-disc-drive shaft or for other high-performance precision spindle-type applications.

The self-activating seal of the invention comprises a permanent-magnet ring adapted to surround a shaft to be sealed and pole pieces in a magnetic flux relationship with the poles of the permanent-magnet ring, and a sealing amount of a ferrofluid. The pole pieces form an air cavity therebetween, the air cavity containing a ferrofluid-storage-retaining gap of defined gap width formed by magnetically permeable extensions of one or both of the pole pieces. The retaining gap formed must be significantly larger than the radial gap formed by or at the ends of the pole pieces. The elements, forming the ferrofluid-retaining gap within the air cavity between the pole pieces, may be formed by altering or preforming the pole pieces, themselves, or by magnetically permeable inserts or extensions in a magnetic flux relationship with the pole pieces or permanent magnet. The ferrofluid-retaining gap is typically placed within the air cavity between the pole pieces in such a manner as to avoid contact of the stored ferrofluid in the retaining gap during handling of the seal apparatus, and typically is placed generally intermediate the air cavity.

It is essential, in the manufacturing and operating of the self-activating seal of the invention, that the distance in the ferrofluid-retaining gap be significantly magnetically greater than the distance of the radial gap which forms the ultimate ferrofluid O-ring seal. The distance across the retaining gap within the air cavity determines the relative magnetic-field intensity, which field intensity must be sufficient to retain and hold magnetically the sealing amount of ferrofluid during storage and prior to the insertion of the magnetically permeable shaft element in the seal apparatus, so that, even though subject to handling and movement, ferrofluid will not be dislodged from the retaining gap. The radial gap between the surface of the shaft and the ends of the pole pieces, which form the O-ring ferrofluid seal, must be much shorter in distance and have a significantly higher magnetic flux intensity, so that, when the magnetically permeable shaft is inserted within the seal apparatus, ferrofluid stored and retained within the retaining gap will move substantially or completely away from the retaining gap to the radial gap and into a sealing relationship with the surface of the shaft.

Therefore, in operation, on the insertion of the magnetically permeable shaft in the seal apparatus, the magnetic flux across the retaining gap essentially should go to zero, substantially zero, or to a very low magnetic intensity, so that there is a complete shift in movement of the magnetic flux intensity to the ends of the pole pieces which form the radial gap with the surface of the shaft element. In such operation, then the ferrofluid is retained within the retaining gap in a secure manner, but, on insertion of the shaft element and the alteration of the magnetic field flux by the presence of the magnetically permeable shaft element, the ferrofluid moves into the sealing relationship within the radial gap.

The retaining gap formed in the cavity should be of a defined, accurate dimension and may vary in distance, but typically may range, for the purpose of illustration, from about 12 to 30 mils, such as, for example, from 15 to 25 mils, while the distance of the sealing radial gap may vary and may range, for example, from about 1 to 15 mils, and typically 2 to 10 mils. The ratio in distance between the ferrofluid-retaining gap to the radial sealing gap should range from about 1.5 to 5.0. The radial sealing gap, being significantly smaller than the retaining gap, creates, on the insertion of the magnetically permeable shaft into the seal apparatus, a new magnetic flux path which is significantly lower in reluctance than the prior reluctance path across the retaining gap, and which radial gap, therefore, preferentially attracts all of the ferrofluid from the retaining gap to the radial gap.

The self-activating, magnetic ferrofluid seal of the invention provides for the secure retention of the ferrofluid within the cavity in the retaining gap during shipment and storage, without any risk of ferrofluid leakage due to shock and vibration or due to the presence of other magnetic seals or other magnetic fields, and, further, by being placed internally within the cavity avoids dislodgement or contamination by the hands of the user. At the point of usage of the seal apparatus, the seal apparatus, normally placed within a nonmagnetic seal housing, is installed and the shaft inserted, to form the new magnetic flux path of lower reluctance, and then rotated to form an O-ring seal or multiple-stage seals, if a multiple-stage seal apparatus is employed. The seal apparatus of the invention is simple, inexpensive and of an effective design. Since the ferrofluid moves directly from the retaining gap to the radial gap, any difficulty concerning the employment and use of high-tolerance passageways in a nonmagnetic ring element, which provide for controlled leakage rate of the ferrofluid, as in the prior self-activating seal patent, is avoided. In U.S. Pat. No. 4,252,353, the ferrofluid is retained at the intersections of the pole pieces and the magnetic ring element, where the magnetic gradient is not great. The employment of a retaining gap, as described in this invention, of carefully controlled dimensions, but larger than the sealing radial gap, provides for a stable and more securely stored ferrofluid. Thus, the seal apparatus and method of the invention provide for a magnetically permeable focusing structure within an air cavity which provides a high magnetic gradient to retain the ferrofluid, but which also permits the insertion of the shaft and the movement of the ferrofluid to the sealing gap. The selection of the retaining-gap and the radial-gap distance is based on the fact that the magnetic field intensity is inversely proportional to the square of the gap distance.

The self-activating ferrofluid seal apparatus and method of the invention will be described for the purpose of illustration only in connection with certain embodiments; however, it is recognized that various changes and modifications may be made in those embodiments by those persons skilled in the art, all falling within the spirit and scope of the invention. For example, this invention will be described in connection with the use of permanent magnets and magnetically permeable pole pieces and inserts of various shapes and structures, which pole pieces and inserts may be formed by machining, molding, bending or other operations. It is also recognized that the seal apparatus may be formed wholly or partially from permanently magnetic or magnetizable material, such as material containing magnetic material therein, such as elastomeric or polymeric material, which may be molded, such as injection-molded, into the desired shape and form for the seal apparatus. For example, the seal apparatus, the permanent magnet or pole pieces, alone or in combination, may be formed of a polymer-based material, such as nylon, or other polymeric material containing a ferrite, such as barium ferrite or other dipole magnetic-type material, to provide a permanent magnet element. The injection-molding of the pole pieces and permanent magnet of magnetic-containing material provides for significant flexibility in various shapes and sizes of the seal apparatus. Such molded design would have an enhanced ability to be assembled easily and may be employed with single ple pieces, double pole pieces or as a multiple-stage seal with a retaining gap within all or some of the multiple-stage seal cavities, in accordance with the present invention.

DESCRIPTION OF THE EMBODIMENTS

Figure 1:
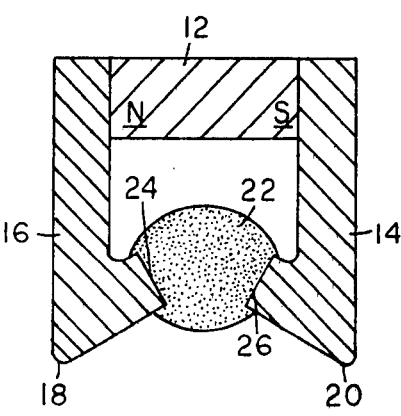
FIGS. 1-7 are illustrative, partial, sectional views of various self-activating ferrofluidic seal apparatuses of the invention.

FIG. 1 is a partial, sectional, schematic view of a self-activating ferrofluid seal apparatus of the invention which comprises an annular permanent-magnet ring element 12 having north and south poles, and which includes pole pieces 14 and 16 composed of a magnetically permeable material or formed of a permanent magnet. The pole pieces 14 and 16 are preformed, so as to provide for angular elbow sections or edges 18 and 20, with the flat ends 24 and 26 of the pole pieces forming a ferrofluid storage and retaining gap therebetween, to retain a sealing amount of ferrofluid 22, by virtue of the magnetic flux lines across the retaining gap from the ends of the respective pole pieces 14 and 16. As illustrated, the pole pieces 14 and 16 are preformed, such as by bending, with the inside diameter of the respective pole pieces formed in a symmetrical fashion, so that their ends 24 and 26 are in a general opposing relationship to form the retaining gap. Of course, if desired, the ends 24 and 26 of the pole pieces may be parallel to each other rather than at an angle. In any event, the ferrofluid 22 captured within the retaining gap comprises an amount of ferrofluid sufficient to effect a seal. As illustrated, the nonuniform retaining gap may range from about 10 mils at the low portion of the pole piece ends 24 and 26 to 15 mils at the top. The ferrofluid 22 in the retaining gap is disposed within the air cavity formed between the two pole pieces 14 and 16 and is disposed in such a manner that the seal apparatus may be encompassed within a nonmagnetic housing (not shown) and may be shipped and handled prior to use, without dislodgement of the ferrofluid 22 held in the retaining gap.

Figure 2:
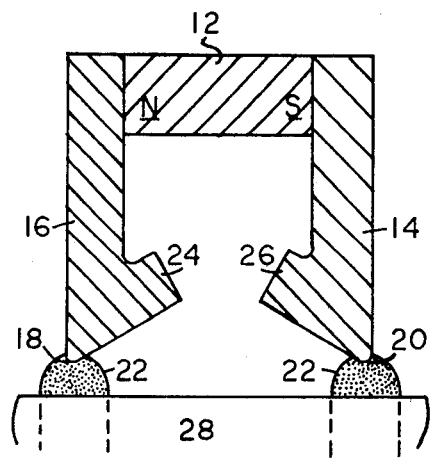

FIG. 2 is an illustrative, partial, sectional, schematic view of the self-activating seal 10 of the invention in a sealing mode, wherein a magnetically permeable, rotary shaft 28 has been inserted within the ring seal apparatus 10 containing the permanent-magnet ring 12 and preformed ring pole pieces 14 and 16. The ferrofluid 22 is shown moved from the retaining gap to the respective radial gap; for example, of 2 to 10 mils, formed between the ends of the elbow sections 18 and 20 and the opposite surface of the shaft 28. The magnetic flux path now passes, rather than through the retaining gap which has diminished substantially to zero magnetic flux, through the permanent magnet 12, the pole pieces 14 and 16, the sealing O-ring amounts of the ferrofluid and the shaft 28. The pair of O-rings formed by the ferrofluid in the radial gap across the surface of the shaft element 28 is illustrated by dotted lines. This self-activating seal apparatus has been illustrated by the formation of an exclusion seal of two O-rings; however, it is recognized that a single O-ring may be formed as an exclusion seal.

Figure 3:
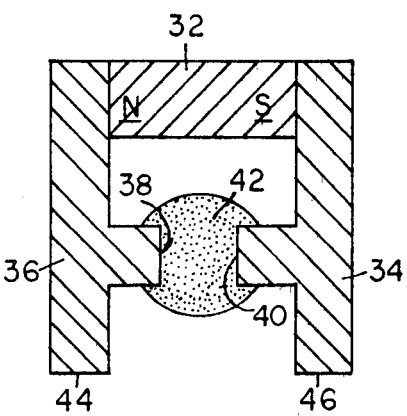
Figure 4:
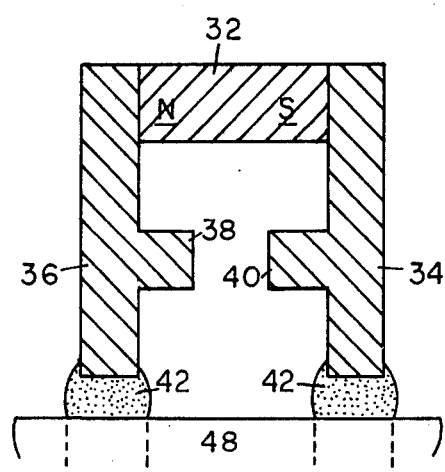

FIGS. 3 and 4 show another embodiment of the self-activating seal apparatus 30 of the invention comprising an annular permanent-magnet ring 32 with annular, preformed pole pieces 34 and 36 having ends 44 and 46, and having extension elements intermediate the pole pieces extending toward each other to form flat ends 38 and 40, to provide a uniform, ferrofluid-storage-retaining gap therebetween, to retain the ferrofluid 42. FIG. 4 is an illustration, wherein the magnetically permeable shaft 48 has been inserted in the seal apparatus 30, illustrating that the ferrofluid 42 has moved from the retaining gap to the radial gap under each end 44 and 46 of the pole pieces 34 and 36, to form an O-ring-type seal.

Figure 5:
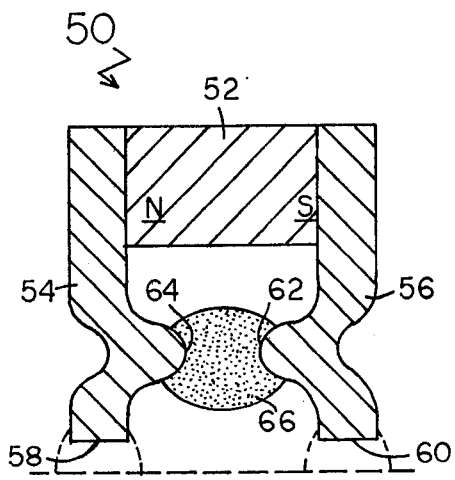
Figure 6:
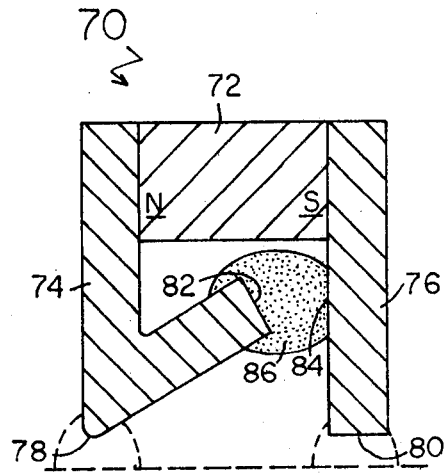
Figure 7:
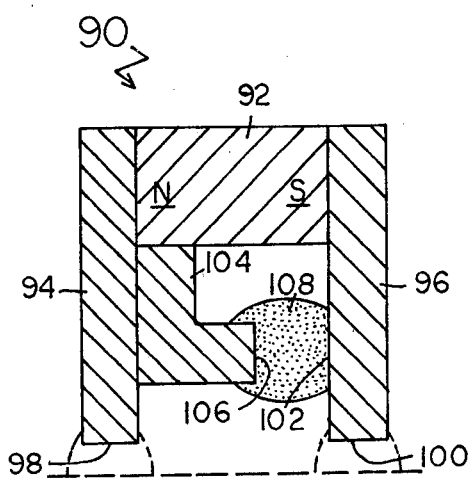

FIGS. 5-7 are illustrative, partial, sectional views of other various embodiments of the self-activating seal of the invention, with the ferrofluid in each seal apparatus shown in the retaining-gap position, and with the ferrofluid in the radial-gap sealing position illustrated by dotted lines under the respective pole pieces, with the dotted line under each of the seal apparatuses representing the surface of a magnetically permeable shaft element.

FIG. 5 is a partial, sectional view of a seal apparatus 50 comprising an annular permanent-magnet ring element 52 having preformed annular pole pieces 54 and 56, with flat ends 58 and 60 which form, with the surface of the shaft element, a defined radial gap for a sealing amount of a ferrofluid 66. The pole pieces 54 and 56 are preformed to have facing, rounded end extensions 64 and 62 extending toward each other in the air cavity formed between the pole pieces 54 and 56, to form a retaining gap therebetween, with a sealing amount of ferrofluid 66 disposed and retained in the sealing gap by the magnetic flux lines of the permanent magnet.

FIG. 6 is a schematic, partial, sectional illustration of a self-activating seal apparatus 70 comprising a permanent-magnet ring 72 and pole pieces 74 and 76, with pole piece 74 having an end 82 extending into the air cavity formed between the pole pieces, and having an elbow end section 78 which forms a radial gap with the surface of the shaft element. The pole piece 76 is a straight pole piece having an end 80 which forms a radial gap with the surface of the magnetically permeable shaft element. A ferrofluid-storage-retaining gap is formed between the end 82 and the opposite interior surface of the pole piece 84 of pole piece 76. If desired, the end of pole piece 82 may be flat and parallel with the surface 84 of pole piece 76.

FIG. 7 shows an illustrative, partial, sectional view of a self-activating seal apparatus 90 having an annular permanent-magnet ring element 92, and straight pole pieces 94 and 96, with ends 98 and 100 forming radial gaps thereunder with the surface of the magnetically permeable shaft element. In the air cavity formed between the pole pieces 94 and 96, there is disposed and secured an L-shaped, preformed, magnetically permeable insert element 104 having a flat end 106. The end 106 is parallel to and opposite the surface 102 of the pole piece 96 and forms therebetween a ferrofluid-storage-retaining gap, to retain the sealing amount of ferrofluid 108 therebetween. The insert 104 may also be extended at one end and placed in direct contact with and across the north pole of magnet 32.

In the embodiments illustrated in the drawings, a cavity is formed within pole pieces and extensions either of the pole pieces or by magnetically permeable inserts used to form a retaining gap within the air cavity, the gap being greater in distance than the radial gap formed by the pole pieces with the surface of the shaft to be sealed, thereby providing a simple, effective and economical self-activating seal, so that, on insertion of a magnetically permeable element in the seal apparatus, the magnetic flux path changes, to concentrate the magnetic-field strength at the radial gap, thereby providing a single-/multiple-stage sealing of the shaft element.

What is claimed is:

1. A self-activating seal apparatus adapted for use with and to seal a magnetically permeable shaft element, which seal apparatus comprises:
    (a) a permanent-magnet ring element having poles of opposite polarity and generally disposed to be aligned axially about the shaft element to be sealed;
    (b) first and second magnetically permeable pole pieces, each of the pole pieces at the one end disposed in a magnetic flux relationship with one pole, respectively, of the permanent-magnet ring element, and each adapted to be disposed at the other end into a close, noncontacting relationship with the surface of the shaft element to be sealed, and to form a small radial gap therebetween;
    (c) a defined sealing quantity of a ferrofluid adapted to seal the shaft element, by forming at least one ferrofluid O-ring seal in the radial gap; and
    (d) ferrofluid-retaining means in a cavity disposed between the first and second pole pieces, which ferrofluid-retaining means is characterized by a ferrofluid-retaining gap therebetween, the retaining gap having a magnetic-field intensity sufficient to retain the ferrofluid in the retaining gap and significantly larger in gap width than the radial gap, whereby, on insertion of the shaft element into the seal apparatus, the ferrofluid, based on the change in the magnetic flux path from the retaining gap to the radial gap, will move from the retaining gap to the radial gap and into a sealing relationship about the surface of the shaft element.

2. The apparatus of claim 1 wherein the radial gap ranges from for example 2 to 10 mils, and the retaining gap ranges from for example 10 to 25 mils.

3. The apparatus of claim 1 which includes a magnetically permeable shaft element disposed within the seal apparatus, the ferrofluid forming a magnetic ferrofluid seal about the surface of the shaft apparatus.

4. The seal apparatus of claim 1 wherein the first and second pole pieces are shaped to form a retaining gap.

5. The seal apparatus of claim 1 which includes a magnetically permeable extension element in the cavity which extends from the first or second or both pole pieces a defined distance, to form a retaining gap between the end or ends of the extension member.

6. The seal apparatus of claim 1 wherein the pole pieces include first and second extension elements having ends extending from the first and second pole pieces in the cavity and toward each other, the ends shaped to form a nonuniform, retaining gap between the ends of the oppositely spaced-apart extension members.

7. The seal apparatus of claim 1 which includes first and second magnetically permeable extension elements having ends extending from the first and second pole pieces, the ends of the extension elements generally opposing each other, to form a uniform retaining gap between the ends of the extension elements.

8. The seal apparatus of claim 1 which includes a magnetically permeable extension element having an end and extending from the first or second pole piece in the cavity and toward the other pole piece, to form a retaining gap between the end of the extension element and the opposite surface of the other pole piece.

9. The seal apparatus of claim 1 wherein the retaining gap is positioned generally centrally in the cavity.

10. The seal apparatus of claim 1 wherein the first and second pole pieces are generally uniform-width, angular elements having an angular end, the angular end of each of the pole pieces adapted to form the radial gap with the surface of the shaft element, and the ends of the pole pieces oppositely disposed to form the retaining gap in the cavity.

11. The seal apparatus of claim 1 wherein the first or second pole piece is an angular pole piece having an angular end, the angular end of the pole piece forming at least one of the radial gaps with the surface of the shaft element, and the end of the pole piece extending into a noncontacting relationship toward the surface of the other pole piece, to form a retaining gap therebetween.

12. The seal apparatus of claim 1 wherein the seal apparatus includes a magnetically permeable extension element disposed in the cavity and having a one and another end, the one end extending into a magnetic flux relationship with one pole piece of the permanent magnet, and the other end extending toward and into a noncontacting relationship with the surface of one of the pole pieces, to form a retaining gap between the surface of the pole piece and the other end of the extension element.

13. The seal apparatus of claim 12 wherein the extension element comprises a generally L-shaped extension element, and wherein the first and second pole pieces are disposed as generally annular, straight, pole-piece elements, with the L-shaped element having one surface in contact and in a magnetic flux relationship with one of the pole pieces.

14. The seal apparatus of claim 1 wherein the first and second pole-piece elements comprise preformed pole-piece elements having rounded projections extending inwardly toward each other in a noncontacting relationship, to form the ferrofluid-retaining gap therebetween.

15. A self-activating seal apparatus, which apparatus comprises in combination:
(a) a magnetically permeable shaft element; and
(b) a seal apparatus which comprises in combination
 (i) a permanent-magnet ring element having poles of opposite polarity disposed about the magnetically permeable shaft element, and
 (ii) first and second annular, magnetically permeable, angular pole pieces preformed to have an angular end and having a one end and another end, one end of each pole piece disposed in a magnetic flux relationship with opposite poles of the permanent-magnet ring element, and the angular ends of the first and second pole pieces extending into a close, noncontacting relationship with the surface of the shaft element, to form small radial gaps between the surface of the angular ends of the pole pieces and the surface of the shaft element, the other ends of the first and second pole pieces extending inwardly into an air cavity defined between the first and second pole pieces and into a noncontacting, oppositely spaced-apart, disposed relationship, to define a ferrofluid-storage-retaining gap therebetween, the retaining gap having a magnetic-field intensity sufficient to retain ferrofluid therebetween and being larger than the radial gap, and having a defined sealing amount of ferrofluid, whereby, prior to the insertion of the shaft element into the seal apparatus, the ferrofluid is disposed and retained by the magnetic flux in the retaining gap, and, on insertion of the shaft element, based on a change in the magnetic flux path, the ferrofluid moves from the retaining gap to the radial gap at the angular ends of each of the first and second pole pieces, to form at least one ferrofluid O-ring seal about the surface of the shaft element.

16. In a method of sealing a magnetically permeable shaft element with a seal apparatus, which seal apparatus comprises a permanent-magnet ring element disposed to surround the shaft element and first and second magnetically permeable pole pieces, which pole pieces, at the one end, are in a magnetic flux relationship with the ring element, and which pole pieces at the other ends extend into a close, noncontacting relationship with the surface of the shaft element to form a small radial gap therebetween, and the first and second pole pieces defining an air cavity therebetween, the improvement which comprises:
(a) forming a retaining gap of magnetically permeable elements in the air cavity, the retaining gap having a width greater than the radial gap and in a magnetic relationship with the permanent magnet sufficient to provide a magnetic field intensity across the retaining gap to retain the ferrofluid in the retaining gap, prior to the insertion of a shaft element into the seal apparatus; and
(b) inserting the shaft element into the seal apparatus to alter the magnetic flux path, to concentrate the magnetic flux at the radial gap, to provide for movement of the ferrofluid from the retaining gap to the radial gap, to form a ferrofluid O-ring seal, on rotation of the shaft element.

17. The method of claim 16 which includes forming a generally uniform retaining gap within the air cavity, the retaining gap being from about one and a half to five times the width of the radial gap.

18. The method of claim 16 which includes forming a nonuniform retaining gap in the air cavity.

19. The method of claim 16 wherein the radial gap ranges from for example 2 to 10 mils, and wherein the retaining gap ranges from for example 10 to 25 mils.

20. The method of claim 16 which includes forming the retaining gap, with one side of the gap formed by the interior surface of a first or second pole piece in the cavity.

21. The method of claim 16 which includes forming the retaining gap by the other ends of the pole pieces extending into the cavity between the first and second pole pieces.

22. The method of claim 16 which includes forming the retaining gap and radial gap, so that, on insertion of the shaft element, the magnetic-field flux across the retaining gap is reduced significantly to about zero.

* * * * *